United States Patent
Meyer

(10) Patent No.: US 12,251,775 B2
(45) Date of Patent: Mar. 18, 2025

(54) METHODS AND DEVICES FOR DETERMINING A REFERENCE FOCUS POSITION OF A BEAM OF BEAM-BASED MACHINE TOOLS BY PERFORMING TEST CUTS ON A WORKPIECE

(71) Applicant: TRUMPF Laser—und Systemtechnik GmbH, Ditzingen (DE)

(72) Inventor: Jeremy Meyer, Leonberg (DE)

(73) Assignee: TRUMPF Laser—und Systemtechnik GmbH, Ditzingen (DE)

( * ) Notice: Subject to any disclaimer, the term of this patent is extended or adjusted under 35 U.S.C. 154(b) by 1251 days.

(21) Appl. No.: 16/229,217

(22) Filed: Dec. 21, 2018

(65) Prior Publication Data
US 2019/0111516 A1    Apr. 18, 2019

Related U.S. Application Data

(63) Continuation of application No. PCT/EP2017/065291, filed on Jun. 21, 2017.

(30) Foreign Application Priority Data

Jun. 22, 2016 (DE) .......................... 102016111455.3

(51) Int. Cl.
*B23K 26/04* (2014.01)
*B23K 26/00* (2014.01)
(Continued)

(52) U.S. Cl.
CPC ........ *B23K 26/048* (2013.01); *B23K 26/0093* (2013.01); *B23K 26/032* (2013.01);
(Continued)

(58) Field of Classification Search
CPC .. B23K 26/00; B23K 26/048; B23K 26/0093; B23K 26/032; B23K 26/0861; B23K 26/0884; B23K 26/38
See application file for complete search history.

(56) References Cited

U.S. PATENT DOCUMENTS 5,682,319 A * 10/1997 Boland .............. G05B 19/4068
                                                                700/189
5,856,649 A *  1/1999 Yamazaki .......... B23K 26/0853
                                                                700/166
(Continued)

FOREIGN PATENT DOCUMENTS

CN         1199357       11/1998
CN       101028671        9/2007
(Continued)

OTHER PUBLICATIONS

JP Japanese Office Action in Japanese Appln. No. 2018-566949, dated Feb. 16, 2021, 6 pages (with English translation).
(Continued)

*Primary Examiner* — Jimmy Chou
(74) *Attorney, Agent, or Firm* — Fish & Richardson P.C.

(57) ABSTRACT

Disclosed are methods of determining a reference focus position of a beam of a beam-based machine tool. The methods providing a relative motion trajectory defining a discoid area with respect to a surrounding area, the discoid area being connected to the surrounding area via at least one bridge area, and performing a sequence of test cuts on a workpiece, wherein at each test cut, a cutting structure is cut in the workpiece by guiding the beam along the relative motion trajectory and the cutting is performed along the at least one bridge area of the relative motion trajectory at differently set focus positions.

12 Claims, 4 Drawing Sheets

(51) Int. Cl.
  *B23K 26/03* (2006.01)
  *B23K 26/08* (2014.01)
  *B23K 26/38* (2014.01)
  *B23K 31/12* (2006.01)
  *B23K 37/02* (2006.01)
  *B23K 37/04* (2006.01)
(52) U.S. Cl.
  CPC ...... *B23K 26/0861* (2013.01); *B23K 26/0884* (2013.01); *B23K 26/38* (2013.01); *B23K 31/12* (2013.01); *B23K 37/0235* (2013.01); *B23K 37/0408* (2013.01)

(56) References Cited

U.S. PATENT DOCUMENTS

| | | | |
|---|---|---|---|
| 6,046,427 A | 4/2000 | Richter et al. | |
| 8,304,691 B2 | 11/2012 | Scholich-Tessmann et al. | |
| 9,274,517 B2* | 3/2016 | Otsuki | G05B 19/416 |
| 9,981,357 B2* | 5/2018 | Lu | G05B 19/19 |
| 10,207,360 B2* | 2/2019 | Wadehn | B23K 26/03 |
| 10,843,296 B2* | 11/2020 | Mienhardt | B23K 26/032 |
| 2001/0042427 A1* | 11/2001 | Yu | B26D 3/10 |
| | | | 83/13 |
| 2003/0052104 A1* | 3/2003 | Matsumoto | C04B 35/185 |
| | | | 219/121.75 |
| 2004/0024485 A1 | 2/2004 | McCoy | |
| 2005/0172764 A1* | 8/2005 | Fagan | B23K 37/0235 |
| | | | 83/13 |
| 2006/0109757 A1* | 5/2006 | Nishiwaki | B23K 26/048 |
| | | | 369/44.14 |
| 2006/0138111 A1 | 6/2006 | Hillebrand et al. | |
| 2006/0157191 A1* | 7/2006 | Matsuo | B23K 26/382 |
| | | | 438/464 |
| 2008/0101687 A1* | 5/2008 | Goeller | B23K 26/032 |
| | | | 382/152 |
| 2008/0180657 A1* | 7/2008 | Scholich-Tessmann | ..................... B23K 26/04 |
| | | | 356/123 |
| 2008/0185368 A1* | 8/2008 | Fagan | B23K 7/001 |
| | | | 219/124.21 |
| 2009/0003952 A1* | 1/2009 | Schmauder | B23K 26/0853 |
| | | | 82/124 |
| 2009/0103579 A1* | 4/2009 | Ushimaru | B23K 26/0626 |
| | | | 372/29.021 |
| 2010/0200552 A1* | 8/2010 | Mienhardt | B23K 26/38 |
| | | | 219/121.72 |
| 2011/0147347 A1* | 6/2011 | Maurer | B24C 1/045 |
| | | | 219/121.18 |
| 2012/0192690 A1* | 8/2012 | Norberg Ohlsson | B23K 26/38 |
| | | | 83/13 |
| 2013/0200051 A1* | 8/2013 | Hert | B23K 26/38 |
| | | | 219/121.67 |
| 2013/0200052 A1* | 8/2013 | Wittwer | B23K 26/1462 |
| | | | 219/121.75 |
| 2013/0327194 A1 | 12/2013 | Hagenlocher et al. | |
| 2014/0060271 A1* | 3/2014 | Norberg Ohlsson | B24C 1/045 |
| | | | 83/13 |
| 2014/0339207 A1* | 11/2014 | Sugiyama | B23K 26/0869 |
| | | | 219/121.72 |
| 2019/0009361 A1* | 1/2019 | Xu | B23K 26/048 |
| 2019/0099993 A1* | 4/2019 | Chen | G02B 27/0075 |
| 2019/0240786 A1* | 8/2019 | Mach | B23K 26/1464 |
| 2020/0055141 A1* | 2/2020 | Schürmann | B23K 26/048 |
| 2020/0189027 A1* | 6/2020 | Lim | B23K 26/0853 |
| 2021/0346991 A1* | 11/2021 | Sugiyama | B23K 26/073 |

FOREIGN PATENT DOCUMENTS

| | | | | |
|---|---|---|---|---|
| CN | 101815596 A | * | 8/2010 | ............ B23K 26/02 |
| CN | 101534974 B | * | 6/2012 | ............ B21D 28/06 |
| CN | 103350281 | | 10/2013 | |
| DE | 102007016301 | | 10/2008 | |
| DE | 102007016301 A1 | * | 10/2008 | ............ G01N 1/286 |
| DE | 102007063627 | | 4/2009 | |
| DE | 102011004117 | | 8/2012 | |
| EP | 0437676 | | 7/1991 | |
| EP | 1750891 | | 10/2007 | |
| EP | 2163339 A1 | * | 3/2010 | ......... B23K 26/0876 |
| JP | 2637523 | | 8/1997 | |
| JP | H1076384 | | 3/1998 | |
| JP | 2006-508352 | | 3/2006 | |
| JP | 2011110591 | | 6/2011 | |
| WO | WO 2004/050290 | | 6/2004 | |

OTHER PUBLICATIONS

CN Office Action in Chinese Appln. No. 201780039204.8, dated Jul. 30, 2020, 15 pages (with English translation).
International Search Report and Written Opinion in International Application No. PCT/EP2017/065291, mailed on Nov. 13, 2017, 19 pages (with English translation).
Office Action in German Application No. 10 2016 111 455.3, dated Feb. 9, 2017, 10 pages (with English translation).

* cited by examiner

METHODS AND DEVICES FOR DETERMINING A REFERENCE FOCUS POSITION OF A BEAM OF BEAM-BASED MACHINE TOOLS BY PERFORMING TEST CUTS ON A WORKPIECE

CROSS REFERENCE TO RELATED APPLICATIONS

This application is a continuation of and claims priority under 35 U.S.C. § 120 from PCT Application No. PCT/EP2017/065291 filed on Jun. 21, 2017, which claims priority from German Application No. 10 2016 111 455.3, filed on Jun. 22, 2016. The entire contents of each of these priority applications are incorporated herein by reference.

TECHNICAL FIELD

The present invention relates to methods for determining a focus position, particularly for laser-based machine tools. Furthermore, the invention relates to machine tools with at least partially automated focus position adjustment.

BACKGROUND

In beam-based, in particular laser-based, machine tools, exact positioning of a focus position (e.g. of a laser or electron beam) is fundamental for the implementation of precise machining of workpieces. To process workpieces with sufficient precision, be it by laser cutting or laser welding, it is necessary to bring the laser beam into contact with the workpiece at the point where the laser beam has the highest power density. In general, machine tools have positioning systems (translation and rotation systems) that allow the machining beam to be set precisely with respect to the position of the workpiece to be machined. In so-called multi-axes laser systems, the beam axis is configured for movements such as translation movements and rotation movements. Furthermore, translation and rotation movements can be provided for the held workpiece.

Methods are known that are based on a manual or optical measurement of the cutting widths of incisions made in a sheet metal, whereby the incisions were made with a varying distance between the workpiece and the beam exit (for example, of a machining head of a machine tool). See, for example, WO 2004/050290 A1. The current focus position is assigned to the incision for which a minimum cutting width has been defined. JP 2637523 B2 and JPH 1076384 A disclose further focus setting procedures.

SUMMARY

Various aspects of the invention relate to methods that allows at least partially automated focus position determination.

In certain aspects, methods for determining a reference focus position of a beam of a beam-based machine tool include providing a relative motion trajectory delimiting a discoid area with respect to a surrounding area, where the discoid area is connected to the surrounding area via at least one bridge area, and performing a sequence of test cuts on a workpiece, wherein at each test cut, a cutting structure is cut in the workpiece by guiding the beam along the relative motion trajectory and the cutting is performed along the at least one bridge area of the relative motion trajectory at differently set focus positions.

In some embodiments, the cutting is performed at test cut-specific positions of the workpiece in the course of the beam and the test cut-specific positions are assigned to a test field of focus positions extending along the propagation direction of the beam.

In some embodiments, the method includes evaluating whether, for a single cutting structure, the workpiece has a disc held by at least one bridge in the discoid area of the relative motion trajectory or whether the workpiece has, in the discoid area of the relative motion trajectory, an opening in the workpiece formed in accordance with the relative motion trajectory, and assigning the reference focus position to a position, in particular within the test field, based on the evaluation of the cutting structures.

In some embodiments, a central group of cutting structures is identified, in which the workpiece has a disc held by at least one bridge in the discoid area, and on each side of the central group, an edge group of cutting structures is identified, in which the workpiece has an opening in the workpiece in the discoid area, and a central position, which is assigned to the central group, or a central position between the edge groups is assigned to the reference focus position.

For example, test cuts are performed in a central area in which the reference focus position is to be expected, and test cuts are performed on both sides of the central area. In addition or alternatively, the test cut-specific focus positions differ by an adjustable step size in the propagation direction.

In some embodiments, the relative motion trajectory in the at least one bridge area has two line segments extending along each other and characterized by a predetermined distance, and when the workpiece is positioned in the reference focus position, the cut widths produced in the bridge area are in the range of 10% to 45% of the predetermined distance.

The relative motion trajectory, for example, has an almost closed ring shape in the discoid area, whereby the almost closed ring shape merges at its ends into line segments of the at least one bridge area. Further, the relative motion trajectory may comprise two substantially mirror-symmetrically extending trajectory sections formed in a central area as opposite semicircular segments between which the discoid area is formed and formed in side areas adjacent to the central area and laying opposite to each other as spaced line segments extending along each other and forming two bridge areas. In this case, the spaced line segments can extend to different distances from the central area.

In some embodiments, the evaluating of the cutting structure can include approaching and irradiating the discoid areas and detecting radiation reflected from the held disc and/or radiation passing through the opening in the workpiece. Furthermore, the evaluating of the cutting structure can include optical recording an image of the workpiece in the area of the sequence of test cuts and image processing of the image to detect held discs and/or openings in the workpiece. Furthermore, the focus position assigned to the reference focus position can be used by a controller for subsequent machining, and in particular for the precise positioning of the focus on the surface of the workpiece.

In some embodiments of the method, the machine tool is configured to position a workpiece in different positions along the propagation direction of the beam and to guide the beam over the workpiece.

In another aspect, machine tools includes a laser processing system with a laser system, a workpiece holder, and a laser processing head. The laser processing head is optically connected to the laser system and a relative motion between the laser processing head and the workpiece holder can be effected to guide a laser beam along a trajectory over the workpiece. The machine tool further comprises a control unit having access to a stored relative motion trajectory, the control unit being adapted to perform a method as described above for determining a reference focus position of a beam.

In particular aspects, the use of a comb plate geometry is extended by a sequence of discoid cutting structures. The sequence of cutout or still essentially concealed/closed cutting structures illustrates where a reference focus position lies. The reference focus position of the laser beam, for example, is the focus position at which the beam focus lies on the workpiece surface, because this is where the highest power density is given and the narrowest cutting gap is created. Whether a cutting structure leads to a cutout opening or "only" to an almost closed cutting line depends on the width of the respective cutting gap, which changes depending on the focus position. This means that when cutting with the reference focus position, the cutting gap width is minimal and the cutting lines of the cutting structure do not overlap (e.g. at the beginning and end of a tree-shaped cutting structure). As the distance from the reference focus position increases, the cutting line becomes wider, resulting in an overlapping of cutting line sections. The inside of the cutting line is thus released from the sheet metal and forms an opening. In other words, the change of focus position results in a remaining or a falling out of the shape determined by the cutting line (e.g. a disc shape). Via a subsequent visual or (partially) automated symmetry evaluation of a sequence of cutting structures with different focus positions, the reference focus position can be assigned, for example, to the center of the remaining discs.

In some embodiments, known incision "comb plate geometries" are extended by a disc contour.

In some embodiments, an automated evaluation of a cut geometry, e.g. a recognition of the falling out of individual discs from cutting structures, can be performed via a camera system or laser sensor technology (e.g. according to the method disclosed in DE 10 2011 004 117 A1). Due to the automated evaluation, there is no need for additional tools (in particular manually operated ones).

In general, the automation of the focus position determination can allow a faster set-up of the machine tool.

The embodiments described herein can provide reproducible results. They can be based on a simple evaluation, which is free of subjective influences, which cannot be prevented particularly for a visual evaluation of comb sheet metal procedures. They can be performed with various laser types and nominal laser powers, each of which must be matched to the test workpiece to be cut.

The embodiments described herein relate in particular to the processing of components for which a workpiece is cut or ablated with a laser beam, for example. The implementation of the embodiments described herein can advantageously lead to a reduction of the error probability as well as a simplification of the focus position determination.

Herein, embodiments are disclosed that allow to at least partly improve aspects of the prior art. In particular additional features and their usefulness result from the following description of embodiments on the basis of the drawings.

DETAILED DESCRIPTION

Aspects described herein are partly based on the realization that the focus position-dependent cutting line width can be used to close a cutting line that is not closed in itself.

In the following, in conjunction with FIG. 1, an exemplary machine tool based on a laser processing system is described that uses the concept of focus position adjustment disclosed herein. An exemplary procedure of the focus position adjustment is explained in connection with the flow diagram of FIG. 2. Subsequently, two exemplary cutting structures are explained with reference to the schematic illustrations of FIGS. 3 to 5 and FIGS. 6 and 7, respectively. FIG. 8 finally shows a section of a correspondingly machined test workpiece. An exemplary scanning procedure is explained in connection with FIG. 9.

Figure 1:
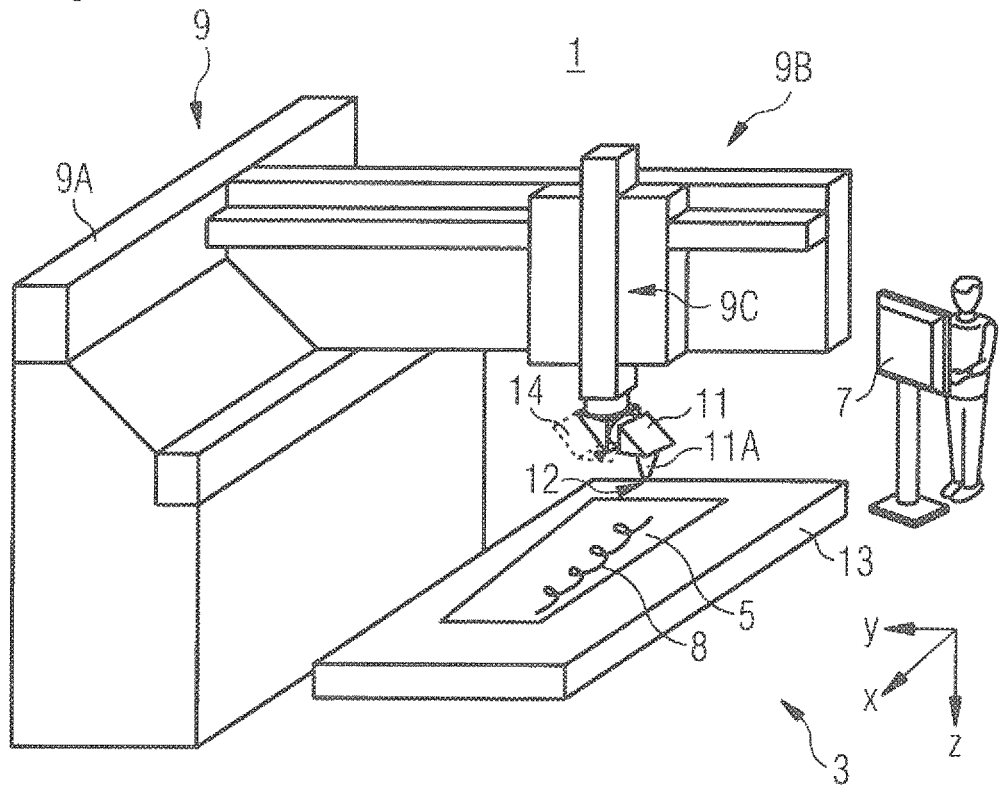
FIG. 1 shows a schematic spatial illustration of a machine tool.

FIG. 1 shows a machine tool 1 with a laser processing system 3 as a basic machine for machining a workpiece 5. The machine tool 1 is operated via a control panel 7 of a control system (not explicitly shown). For example, the creation and adjustment of numerically controlled (NC) programs at the control panel 7 can be used to create specific work sequences tailored to workpieces and their machining. The sequences can be used for machining the workpiece itself as well as for setting the machine tool. For example, machine tool 1 has a switch cabinet with the control system, providing an associated computer numerically controlled (CNC) control, an electrical supply for drives and general logic and power parts.

A laser device, not explicitly shown in FIG. 1, of the laser processing system 3 is used to generate laser radiation. The laser device can be based, for example, on a solid-state laser such as a disk laser or fiber laser or a gas laser such as a $CO_2$ laser. Laser light cables and/or mirrors can be used to guide the beam from the laser device to the workpiece. Further components of machine tool 1 include, for example, a rotary changer for holding the workpiece 5 to be machined and for easy removal of machined workpieces, a compact dust extractor for extracting smoke gases and suspended particles from the interior, a scrap conveyor as well as elements for pneumatics, for cutting and welding gas supply as well as for central lubrication.

A process controlled by the CNC control allows the machining of the workpiece 5 in a predetermined way with the interaction of the various components of the laser processing system 3. Thereby, a workflow can be repeatedly performed and a large number of workpieces can be machined efficiently and essentially identically—despite potential variations in the dimensions due to tolerance ranges.

A programmer creates the NC program for the respective machining within a programming system on the computer, i.e. for example on the control panel 7 of the control system. The path of the laser, defined by a relative motion trajectory 8 (schematically indicated in FIG. 1) between the laser beam and the workpiece, can be calculated by the control system automatically or with input from the operator. For example, in a laser cutting process, the course of the gap and the gap width of the cut result from the beam diameter at the workpiece and the relative motion trajectory 8. The control system can set the machining sequence, locate initial cutting points at the correct positions, round off sharp corners or provide trimming cuts. The control system can implement the strategies that the programmer has selected specifically for the workpiece. In a preparatory simulation, the programmer can see how the NC program is executed.

To ensure that the cutting quality is correct, the NC program supplies the control with the appropriate values for processing parameters such as cutting speed, laser power, nozzle distance, and focus position. These values are stored in so-called technology tables, which the controller can access. Furthermore, the machining parameters include workpiece-specific parameters such as tolerance limits of (e.g. sheet metal) edges and maximum possible motion speeds of the machining head relative to the workpiece and/or the speed of distance adjustment.

FIG. 1 also schematically shows the set-up of the laser processing system 3, which is located, for example, in the interior of a safety enclosure. The laser processing system 3 has a movement unit 9 with functionally relevant components such as x, y and z slides 9A, 9B, 9C for moving beam guiding and matter supply components relative to the workpiece 5, e.g. in accordance with the relative motion trajectory 8 provided by the control system.

In general, the beam guidance components can include laser light cables, a z-sleeve, collimation optics, and processing optics for guiding and focusing the laser beam to the workpiece 5. The processing optics are usually provided in a processing head 11 with a nozzle 11A having a beam exit 12. The processing head 11 can, for example by means of further rotary and swivel axes, be positioned and aligned essentially freely in space and thus guide the exiting laser beam specifically over the workpiece 5. Other axes, in particular redundant ones, can improve a quick adjustment of the position and alignment of the machining head 11 to the workpiece 5. The processing head 11—also known as the cutting head in the case of laser cutting—forms the laser beam into a cutting tool via lens or mirror-based adjustable focusing optics. The distance of the nozzle 11A to the workpiece and/or the focusing optics of the processing head 11 can be adjusted such that the beam focus of the laser beam lies, for example, on the surface of the workpiece 5. With this information (the distance or adjustment of the focusing device at which the beam focus is on the surface of the workpiece 5), a desired focus position can be set during subsequent processing of the workpiece. The laser beam exits the processing head 11 via the nozzle 11A together with a cutting gas, for example. For the machining of the workpiece 5, the distance to the workpiece 5 can be in the range from 0.5 mm to 2 mm, for example, e.g. in the range from 0.7 mm to 1.2 mm.

In the exemplary embodiment of the movement unit, the machining head 11 can assume any adjustable position and orientation in a range determined by the x, y, and z slides 9A, 9B, 9C and by the mobility of the-sleeve. The x, y, and z slides 9A, 9B, 9C are assigned to drive units that allow the machining head 11 to move relative to the workpiece 5. The machining head 11 is aligned with the workpiece 5 by means of the rotary and swivel axes. Thereby, a working space is defined that encompasses all points that can be processed by the laser beam focused accordingly.

The workpiece 5 can be fixed to a workpiece support device 13 using a clamping technique (not shown). In certain embodiments, the workpiece 5/the workpiece support device 13 or only the workpiece 5/the workpiece support device 13 can also be moved in space. The concepts applied herein can be adapted accordingly to be used in such configurations.

The workpiece support device 13 usually includes further elements such as clamps for clamping the workpiece 5 as well as sensors for part recognition and drives for moving the workpiece support device 13.

In general, formed sheet metal parts are an example of a three-dimensional, variably formed workpiece 5. The workpiece 5 shown in FIG. 1, for example, is a test workpiece that is used specifically to determine the focus position. As an example, the relative motion trajectory 8 is shown, along which the laser beam is guided over the workpiece 5 for the focus position determination. In some applications, the workpiece 5 may alternatively be an area of the workpiece not required for the product to be produced. Typical workpieces are made of a metal, such as steel, aluminum, or copper, or a metal alloy. However, functional ceramics, plastics, organic materials, or other materials are also possible.

In exemplary cutting processes, the workpiece 5 can be processed with the laser beam with a separation cut during the laser cutting, i.e., the laser parameters, in particular the laser power, are set in such a way that the workpiece 5 is separated into two areas separated from each other by a cutting line extending along the motion trajectory 8. For example, when the laser beam is activated, the processing head 11 is moved towards the workpiece 5 from above, to cut into the workpiece 5. The relative movement then takes place along the relative motion trajectory 8 by moving the laser beam/processing head 11 and the workpiece 5 relative to each other so that a continuous cutting gap can be created in the workpiece.

Significant for a clean cut is, in particular, the focus position with respect to the workpiece 5 or the exact knowledge of the focus position for a correct control of the relative motion trajectory 8. Thus, when cutting, the distance between the cutting nozzle 11A and the workpiece 5 is to be controlled as accurately as possible to a nominal value (also referred to here as the working distance), so that the focus during the cutting process is continuously in an optimal position with respect to the material surface and the cutting gas can, for example, flow optimally into the cutting gap. The focus position is adjusted by the focusing optics depending on the selected nozzle distance. As even small deviations in the distance can influence the cutting result, the working distance, accordingly the distance between the cutting nozzle 11A and the workpiece 5, is usually monitored by active sensors and continuously readjusted. For this purpose, the sensors generally measure the distance between the cutting nozzle 11A and the workpiece 5 continuously. The working distance to be applied can vary depending on the respective processing methods and laser systems. For example, fusion cutting requires a small distance in the millimeter range to allow the cutting gas to flow into the cutting gap.

The focus position can be changed in relation to the surface of the workpiece 5 by adjusting the focusing optics and/or changing the distance of the nozzle 11A (i.e. the machining head 11) to the workpiece 5. If the focus position is above the workpiece, an opening forms in the workpiece that widens downwards. If the focus position is below the workpiece, an opening is formed that widens upwards. If the focus position is on (or close to) the surface of the workpiece, an opening with essentially parallel sidewalls is created. In workpiece processing, for example, the focus of the laser beam is on the top side of the workpiece or inside the workpiece.

The reference focus position of the laser beam is the focus position at which the beam focus is essentially on (or close to) the workpiece surface, for example. With this focus position, the narrowest cutting gap is usually achieved in workpiece 5 because then the highest power density is given on the workpiece surface. The distance of the nozzle 11A to the surface of the workpiece 5 and/or the focusing optics of the processing head 11 are then set, for example, so that the beam focus of the laser beam is on the surface of the workpiece 5.

The focus position determination described below is described as an example using the flat workpiece 5, e.g., a sheet metal plate. However, it can generally also be performed on non-planar workpieces.

For some embodiments of the focus position determination, the laser processing system 3 can further include a camera 14 for evaluating a test cut procedure. In FIG. 1, the camera 14 is provided on the machining head 11, for example. The camera 14 is usually part of the control unit of the laser processing system 3.

The test cutting process described below is usually preceded by a positioning and/or cutting process. The aim of this positioning and/or cutting process is, among other things, to ensure that the machining head 11 can cut a specific cutting contour into the workpiece 5 at a predetermined distance beginning at the machining position linked to a start position. The positioning and/or cutting process is assumed below and can take place once or several times, for example for spatially separated cutting segments.

The flow chart shown in FIG. 2 generally illustrates the procedure for determining the focus position, as explained below for two exemplary types of cutting structures. The procedure comprises a test cut step 21, an evaluation step 23 of the test cut step 21, an assignment step 25 of the actual focus position on the basis of the evaluation result, and an adjustment step 27 of the focus position for subsequent workpiece processing.

Figure 2:
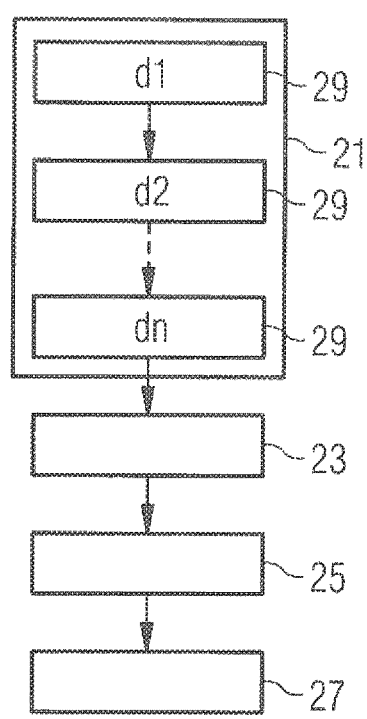
FIG. 2 shows a schematic flow chart to illustrate an exemplary sequence of a focus position setting.

FIG. 2 illustrates that test cut step 21 relates to a sequence of cutting structures 29. The cutting structures 29 are done at different focus positions along the propagation direction of the laser beam with respect to the workpiece 5. In FIG. 1, different focus positions correspond to a change in position of the focus in the z-direction assuming a test workpiece that is planar in the x-y-plane.

The focus position with respect to the workpiece 5 is generally determined by the optical path length of the beam path traveled by the laser beam to the workpiece 5. If an unchanged path length to the beam exit 12 of the nozzle 11A is assumed, the focus position with respect to workpiece 5 is defined by the distance d1, d2 to dn of workpiece 5 to the beam exit 12 of the nozzle 11A. Alternatively or additionally, the focus position with respect to the workpiece 5 can be defined by the position of a movable optical element in the beam path, e.g., a mirror. In the following description, the distances d1, d2 to dn of the workpiece 5 to the beam exit 12 are exemplary for the adjustability of the focus position in the z-direction. The skilled person will understand that the concepts disclosed herein can be transferred accordingly if the optical path length can be adjusted differently.

The test cut step is followed by an evaluation step 23, an assignment step 25, and an adjustment step 27. In the evaluation step 23, the sequence of cutting structures 29 is first examined for a cutting result. In the assignment step 25, a cutting structure is then assigned to the reference focus position, based on which the reference focus position is then set in the setting step 27 within the control of the processing machine.

Figure 3:
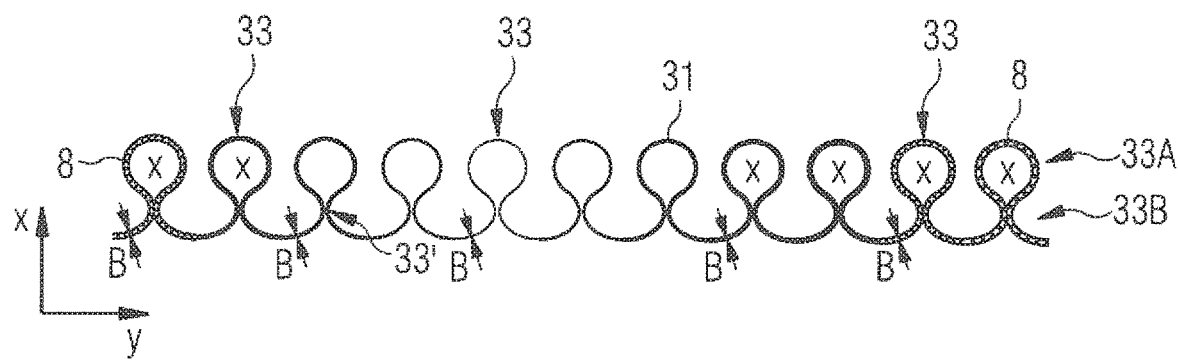
FIG. 3 shows a schematic illustration of a first exemplary course of a cutting line in the plane of a flat test workpiece.

FIG. 3 schematically shows a cut course 31 of a separation cut as it would result if a workpiece were cut according to a relative motion trajectory including a sequence of, for example, identical tree-shaped cutting structures 33. In the first and the last two cutting structures 33, the relative motion trajectory 8, on which the cut is based, is indicated with a white dotted line as an example. For each new cutting structure 33, the focus position was changed by a fixed step size. In FIG. 1, this would correspond to a relative position of the focus position with respect to the plate-shaped workpiece 5 that was changed by one step size (increment) Δz.

In the cutting process 31 of FIG. 3, the focus position of the laser beam was moved through the workpiece 5 because a cut width B of the cut from left to right first decreases and then increases again.

The cutting structures 33 described as tree-shaped are based on a relative motion trajectory 8, which has a crown area 33A and a stem area 33B. In the stem area 33B, the sections of the relative motion trajectory 8 passing along each other are spaced from each other such that the relative motion trajectory 8 yields a sequence of almost completely cutout disc contours. Each of the disc contours is connected to the remaining material of the workpiece 5 via a bridge 33'.

For the cutting structures 33 marked "x" in FIG. 3, the performed cuts overlap in the stem area 33B due to the width B of the separation cut, so that cut-out discs can fall out. In the evaluation step 23, this falling out can be detected visually or with the camera 14, for example. As an alternative or in addition, the method previously mentioned and known from DE 10 2011 004 117 A1 can be used to check the cutting process. If the focus is in the area of the workpiece 5, the width B of the respective separation cut is not large enough to completely take away the bridge 33' defined by the relative motion trajectory 8, so that the discs remain attached to the workpiece 5.

Figure 4:
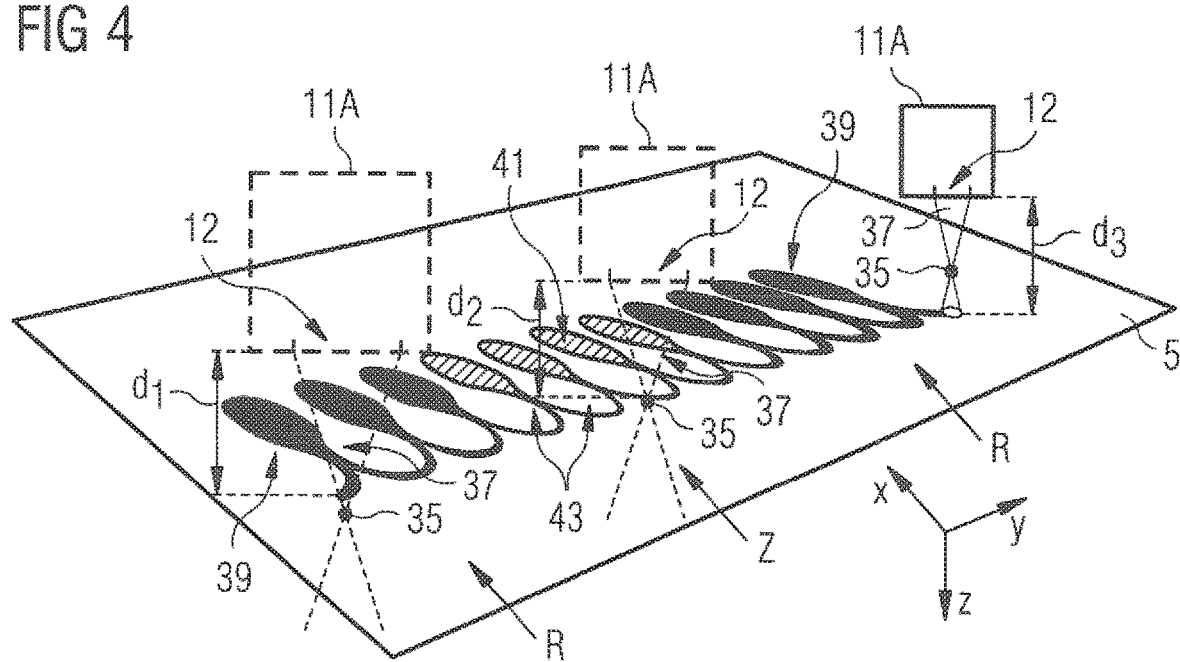
FIG. 4 shows a schematic perspective illustration of a laser cutting process to generate the cutting line from FIG. 3 with varying distance of the beam exit of a processing head to the test workpiece.

FIG. 4 illustrates the test cutting step of FIG. 3 in a perspective view. The nozzle 11A is schematically indicated at three positions of a sequence of test cuts. An associated laser beam focus 35 of a laser beam 37 and the associated distances d1, d2, d3 between the beam exit 12 and the surface of the workpiece 5 show how the laser beam focus 35 is located first below the workpiece 5 (smallest distance d1), then on or near the surface of the workpiece (distance d2>d1) and finally above the workpiece 5 (largest distance d3>d2). Each of the distances d1, d2, and d3 defines a focus position 35 of the laser beam 37 that is specific to the respective cutting structure 33 performed in a test cut and extending along the propagation direction of the laser beam. The adjacent cutting structures 33 define a test field of focus positions 35. The test field comprises a central area in which the reference focus position is to be expected. The test cuts are performed on both sides of the central area and in the central area. The test cuts differ, for example, by a step size in the propagation direction, which can be adjusted in particular, i.e., the test cuts are generated with different focus positions.

As in the cutting structures 33 marked "x" in FIG. 3, the inner plate has fallen out (black cut-out openings 39 in FIG. 4), only in the five central cutting structures 33 can it still be seen that material discs 41 (emphasized by dashing in FIG. 4) of the workpiece 5 are still present inside the corresponding crown areas 33A and are connected via thin bridges 43 to the remaining material of the workpiece 5 forming a surrounding area 44.

The five central cutting structures 33 form a central group Z of successive cutting structures in which the workpiece has a disc held by at least one bridge area in the discoid area. The cutting structures 33 marked with "x" form on each side of the central group Z an edge group R of, in particular, successive positions of cutting structures in which the workpiece has, in the discoid area, an opening in the workpiece.

Figure 5A:
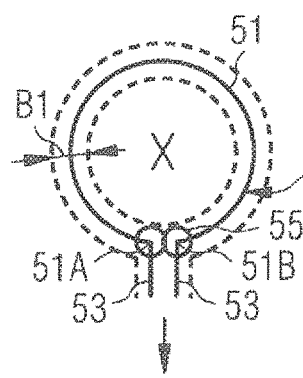
FIGS. 5A-5C show schematic illustrations for clarifying open and closed cutting lines.

For the test cut step shown in FIGS. 3 and 4, FIGS. 5A to 5C illustrate the relationship between the relative motion trajectory 8 and the resulting separation cut in the case that the cut is performed in the area of the reference focus position 35 (FIG. 5B) or at a distance from the reference focus position 35 (FIG. 5A).

In the crown area 33A, the relative motion trajectory 8 forms, for example, an almost closed circle, i.e. a circular segment 51 of e.g. approx. 350°. Start point 51A and end point 51B are connected to linear line segments 53 that extend parallel to each other (generally along each other) and are spaced apart from each other and correspond to the stem area 33B. The relative motion trajectory 8 implemented in FIG. 5C (as in FIGS. 3 and 4) was rounded off for a uniform motion. However, it has essentially the same characteristics, an almost closed circular-segment-type course in the crown area 33A and at least a section-wise parallel course in the stem area 33B.

Figure 5B:
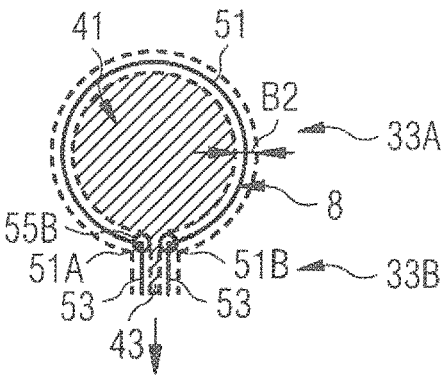

In the transition area between the crown area 33A and the stem area 33B, FIGS. 5A and 5B indicate exemplary beam diameters 55A, 55B, which determine the respective widths B1, B2 of the cutting gap (edges dashed along the relative motion trajectory 8). Beginning at a certain minimum width, no bridge remains (or it is so unstable that it can no longer hold the disc), and the disc was removed by the separation cut. For the width B1 in FIG. 5A, one can see that the beam diameters 55A overlap, i.e., no bridge is formed. For the smaller width B2 in FIG. 5B, the (smaller) beam diameters 55B do not overlap and the disc 41 is held by the bridge 43.

Figure 5C:
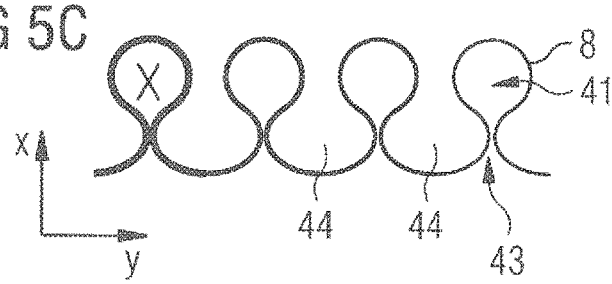

As the programmed bridge of the relative motion trajectory 8 always has the same width, ideally the increase of the cutting gap width leads to the destruction of the bridge, so that the disc falls out (left in FIG. 5C). Depending on the width of the cutting gap, the stability of the contour is only ensured by the very delicate bridge 43 remaining on one side. The individual bridge 43 can lead to errors with regard to an automated and robust evaluation step if, for example, a bridge 43 remains in principle, but the bridge is not strong enough to hold the disc 41. In some constellations, for example, the tree-shaped cutting structures 33 can be too unstable.

In particular, the bridge can also be bent during an evaluation step performed in particular by means of laser beam scanning, for example due to the effect of the flowing cutting gas, whereby the result is distorted.

The provision of a second bridge by a modified relative motion trajectory (or generally the provision of a plurality of bridges) can provide the disc with the required support. Thereby, a less error-prone evaluation step can become possible. An exemplary implementation is illustrated in connection with FIGS. 6 to 8.

Figure 6:
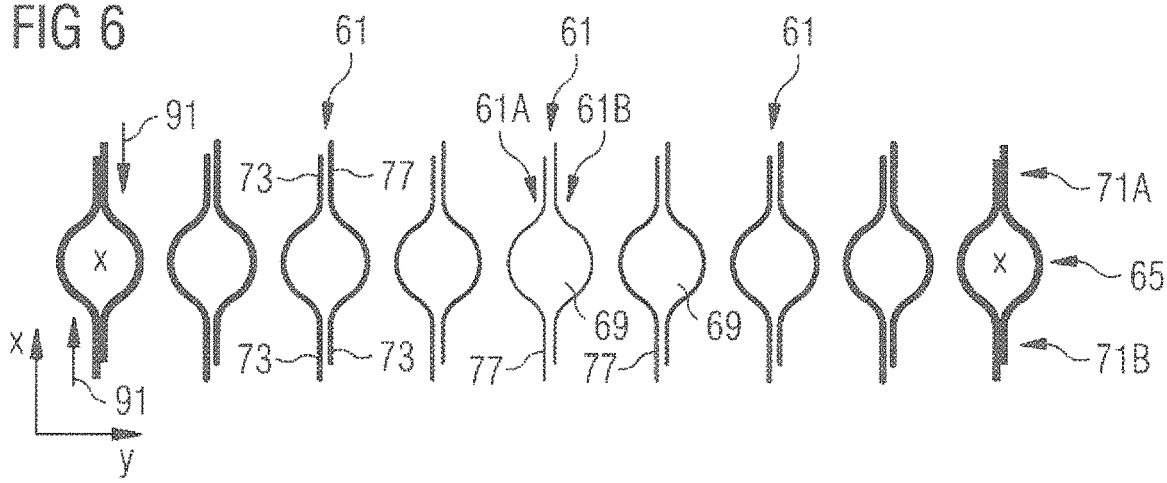
FIG. 6 shows a schematic illustration of a second exemplary course of a cutting line in the plane with varying distance of the beam exit of a machining head to the test workpiece.
Figure 7:
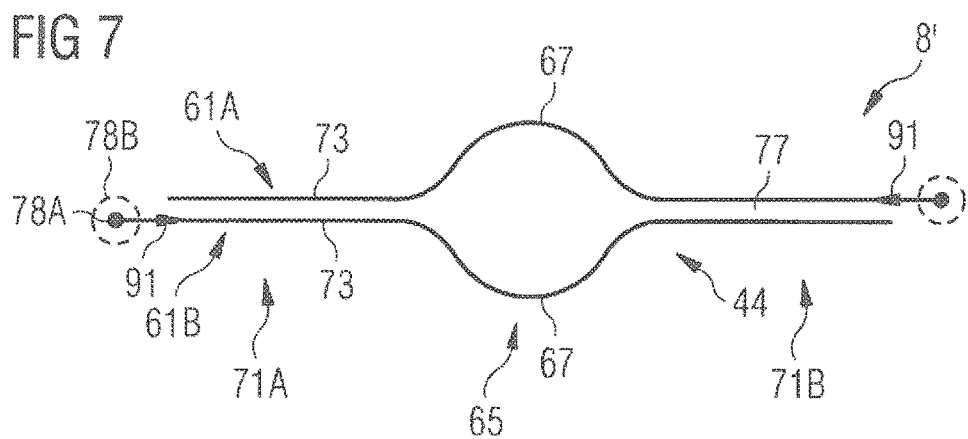
FIG. 7 shows an enlarged illustration of a cutting structure of the course of the cutting line of FIG. 6.
Figure 8:
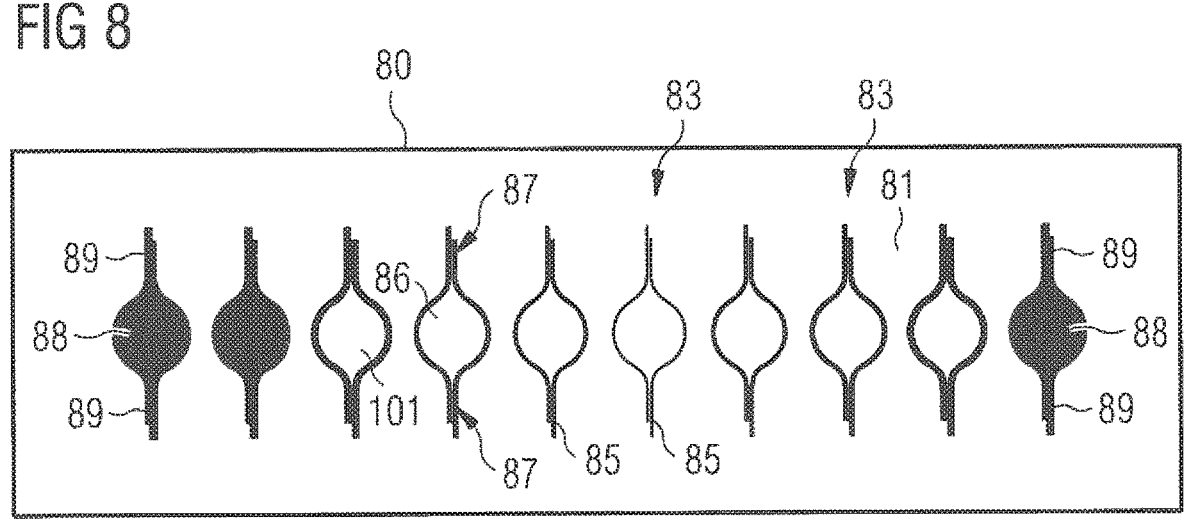
FIG. 8 shows a photo of a test sheet metal after the test cut step and the evaluation step based on a course of the cutting line according to FIG. 7.

FIGS. 6 and 7 show exemplary cutting structures 61, which were cut with different focus positions (FIG. 6), and a section of the relative motion trajectory 8' for the generation of a cutting structure 61 (FIG. 7). The cutting structures 61 were created with two trajectory sections 61A, 61B, which are essentially mirror-symmetrical. In a central area 65, the trajectory sections are shaped as opposite semi-circular segments 67, between which a discoid area 69 is formed. On adjacent side areas 71A, 71B, which are opposite to each other, the semicircular segments 67 continue as essentially parallel line segments 73 at a distance. In general, a given distance can be assigned to the line segments 73. Accordingly, depending on the cutting width, (filigree) bridge structures 77 can form on opposite sides of a cutout disc. The minimum width of a bridge 77 results from the difference between the given distance of the line segments 73 and the cutting width.

If the cutting width becomes too large, the bridges are too weak or they are no longer formed at all, so that the discs are cut out and fall out. For clarification, a focus diameter 78A (i.e. the laser beam diameter at reference focus position) and a beam diameter 78B at a distance from the reference focus position at the insertion points (laser switch-on points) are indicated in FIG. 7. For example, if the workpiece 5 is positioned in the position of the reference focus position, cutting widths are produced for the measurement in the bridge area, which are in the range of e.g. 10% to 45% of the specified distance. In general, the specified distance is selected so that a sufficiently stable bridge structure is formed at the reference focus position, i.e., at the position at which the focus position is optimally aligned in/on the workpiece.

In the cutting structures 61 marked "x" in FIG. 6, the separation cuts produced overlap in the central area 65, for example, due to the width of the separation cut so that the discs can fall out. For the cutting structures 61 in between, on the other hand, the discs 69 are held by the bridges 77 that are opposite to each other.

FIG. 8 shows an image 80 of a test plate 81 for which a focus position determination was performed. In the test plate 81, only cutting lines with different widths 85 (black) in the form according to FIG. 7 can be seen for medium cutting structures 83, so that a disc 86 is held respectively by two bridges 87. In contrast, two (black) holes 88 are visible on the left side and a (black) hole 88 is visible on the right side, while the (black) cutouts/holes 88 continue on opposite sides as linear incisions 89 with different widths.

As further illustrated in FIG. 7, the straight line segments 73 allow only one line segment to be provided in the area of the incision into the workpiece 5. For this, the pairwise line segments are approached in opposite direction (FIGS. 5 and 6 show arrows 91 in the "+x" direction and "−x" direction, respectively) and an incision, i.e. the beginning of each separation cut, takes place at a greater distance from the disc 69 (e. g. the disc center) than the ending of the other cut (e. g. by laser switching off). Thereby, one can prevent that an incision hole 93 produced during incision and having a diameter that can exceed the width of the separation cut, causes the disc to fall out unwanted, even though bridge structures were formed close to the disc.

Examples for the dimensioning of the trajectory section 8' shown in FIG. 7 are a radius of curvature in the central area 65 in the range from 1 mm to 3 mm, e. g. 1.5 mm, a length of the line segments 73 e. g. in the range from 3 mm to 10 mm, whereby the length of the line segment extending from the insertion hole 93 is somewhat greater (e. g. 1 mm to 3 mm greater). Furthermore, the transition from the side areas 71A, 71B to the central area 65 can be smoothed with a radius in the range from 1 mm to 3 mm.

Figure 9:
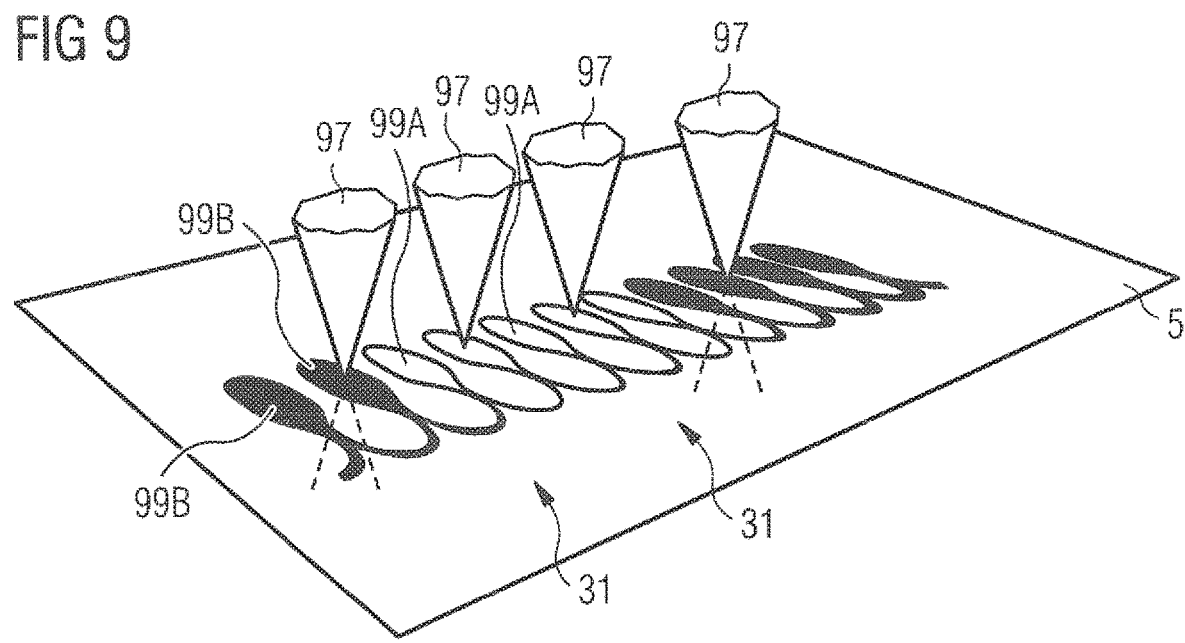
FIG. 9 shows a schematic perspective illustration of an evaluation step for the recognition of open and closed cutting structures of the test cutting process of FIG. 4.

FIG. 9 illustrates an evaluation step 23 exemplarily for the tree-type cutting structure 31, the evaluation step 23 being based on scanning the individual cutting structures 31 with a laser beam 97. The laser is used to detect whether a disc 99A is still held by a single bridge in this case or whether the disc has been completely cut out and has thus fallen out, forming an opening 99B in the workpiece 5.

For example, the 11A nozzle is positioned centrally above the center of each cutting structure 31 and the 97 laser beam is switched on. If the laser beam 97 hits the still held disc 99A, the laser beam 97 is reflected. The reflected light can be detected. If, on the other hand, there is an opening 99B, the laser beam 97 passes through the workpiece 5 and there is no reflection, i.e., no reflected light is detected. The test workpiece 81 shown in FIG. 8 shows, for example, impact points 101 of the laser beam on the maintained discs. Alternatively or in addition, the light that has passed through an opening can be detected.

In this manner, the sequence of cutting structures 31 can be assigned a series of measured values that takes into account the cut width and thus the focus position. For example, openings can be assigned the value "0" and the held disc the value "1" (evaluation step 23 in FIG. 2). Accordingly, for FIG. 9, the evaluation result of the evaluation step results in the measurement value sequence: 0-0-1-1-1-1-1-0-0-0-0. Thereby, between each measurement value, the focus position was moved, for example, by a fixed step size in the propagation direction (e.g. in FIG. 1 in z-direction).

As an alternative to the automated evaluation of the cutting structures 31, an operator can also manually evaluate the cutting structures 31. Alternatively or in addition, the sequence of cutting structures can also be evaluated, for example, by image recognition of an image captured by the camera 14 and corresponding measurement values can be assigned to the individual cutting structures.

If a symmetrical widening of the gap is assumed in case of deviation from the reference focus position, the reference focus position can be assigned to the center between the opening measurement values "0" (assignment step 25 in FIG. 2). In the example measurement of FIG. 9, the reference focus position lies correspondingly at the central one of the disc measurement values "1" in the workpiece 5.

With an even number of disc measurement values "1", the reference focus position can be assumed to lie between the central target measurement values and can be interpolated accordingly with the aid of the step size. The reference focus position is stored in the control unit and is used for subsequent machining and, in particular, the exact positioning of the focus on or in the workpiece (setting step 27 in FIG. 2).

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A method for determining a reference focus position of a beam of a beam-based machine tool, the method comprising:
    providing a relative motion trajectory that delimits a sequence of discoid areas with respect to a surrounding area, wherein the discoid areas are each connected to the surrounding area via at least one respective bridge area for each discoid area;
    performing a plurality of test cuts on a workpiece, wherein at each test cut of the plurality of test cuts, a cutting structure is cut in the workpiece by guiding the beam of the beam-based machine tool along the relative motion trajectory around a discoid area and along the bridge area to form a plurality of cutting structures, wherein each test cut is performed along the at least one bridge area of each of the discoid areas of the relative motion trajectory at a different focus position, wherein test cuts at focus positions that result in narrow cutting widths form a bridge that connects the cutting structure to remaining material of the workpiece, and test cuts at focus positions that result in wide cutting widths that overlap in the bridge area sever the cutting structure from remaining material of the workpiece and cause the cutting structure to fall out of the workpiece;
    evaluating whether for a single cutting structure of the plurality of cutting structures, the workpiece has the single cutting structure held by at least one bridge in the discoid area of the relative motion trajectory or whether the workpiece has, in the discoid area of the relative motion trajectory, an opening in the workpiece where the single cutting structure has fallen out of the workpiece, and
    assigning the reference focus position, based on the evaluating of the plurality of cutting structures.

2. The method of claim 1, wherein evaluating comprises irradiating the associated discoid area and detecting radiation reflected from the held disc and/or radiation passing through the opening in the workpiece.

3. The method of claim 1, wherein evaluating comprises optically recording an image of the workpiece in the area of the sequence of test cuts and processing the image for recognition of held discs and/or openings in the workpiece.

4. The method of claim 1, further comprising controlling machining of the workpiece based on a focus position assigned to the reference focus position.

5. The method of claim 1, further comprising
    identifying a central group of cutting structures, in which the workpiece has a disc held by at least one bridge in the discoid area,
    identifying, at the sides of the central group, edge groups of cutting structures, in which the workpiece has an opening in the discoid area, and
    assigning a central position of the central group or that is positioned centrally between the edge groups as the reference focus position.

6. The method of claim 1, wherein test cuts are performed in a central area in which the reference focus position is to be expected, and test cuts are performed on both sides of the central area, and/or
    wherein the focus positions specific to the test cuts differ by an adjustable, step size in a propagation direction.

7. The method of claim 1, wherein the relative motion trajectory in the at least one bridge area comprises two line segments extending along one another and characterized by a predetermined distance, and wherein, when the workpiece is positioned in the reference focus position, cut widths generated in the bridge area are in the range of 10% to 45% of the predetermined distance.

8. The method of claim 7, wherein the relative motion trajectory in the discoid area has a substantially closed annular shape, wherein the substantially closed annular shape merges at ends of the substantially closed annular shape into the two line segments of the at least one bridge area.

9. The method of claim 1, wherein the relative motion trajectory comprises two trajectory sections extending substantially mirror-symmetrically, wherein the trajectory sections are formed in a central area as opposite semicircular segments, between which the discoid area is formed, and formed in side areas, which are adjacent to the central area and lay opposite to each other, as spaced apart line segments extending along each other and forming two bridge areas.

10. The method of claim 9, wherein the spaced apart line segments extend different distances away from the central area with respect to one another.

11. A machine tool comprising
a laser processing system with a laser system,
a workpiece holder,
a laser processing head, wherein the laser processing head is optically connected to the laser system and a relative motion between the laser processing head and the workpiece holder for guiding a laser beam along a trajectory over the workpiece can be controlled, and
a controller configured to obtain a relative motion trajectory that delimits a sequence of discoid areas with respect to a surrounding area, wherein the discoid areas are each connected to the surrounding area via at least one respective bridge area for each discoid area, wherein the controller is configured to cause the laser beam to perform a plurality of test cuts on the workpiece, wherein at each test cut of the plurality of test cuts, a cutting structure is cut in the workpiece by guiding the laser beam along the relative motion trajectory around a discoid area and along the bridge area to form a plurality of cutting structures, wherein each test cut is performed along the at least one bridge area of each of the discoid areas of the relative motion trajectory at a different focus position;

wherein test cuts at focus positions that result in narrow cutting widths form a bridge that connects the cutting structure to remaining material of the workpiece, and test cuts at focus positions that result in wide cutting widths that overlap in the bridge area sever the cutting structure from remaining material of the workpiece and cause the cutting structure to fall out of the workpiece; and wherein the controller is further configured to evaluate whether for a single cutting structure of the plurality of cutting structures, the workpiece has the single cutting structure held by at least one bridge area in the discoid area of the relative motion trajectory or whether the workpiece has, in the discoid area of the relative motion trajectory, an opening in the workpiece where the single cutting structure has fallen out of the workpiece, and to assign a reference focus position based on the evaluation of the plurality of cutting structures.

12. The machine tool of claim 11, further comprising a camera configured to record an image of the cutting structure generated at each test cut in accordance with the relative motion trajectory.

* * * * *